(12) United States Patent
Nakamura et al.

(10) Patent No.: US 7,618,727 B2
(45) Date of Patent: Nov. 17, 2009

(54) FUEL CELL UNIT, CONTROL METHOD FOR FUEL CELL UNIT, AND INFORMATION PROCESSING APPARATUS

(75) Inventors: Koji Nakamura, Akiruno (JP); Akihiro Ozeki, Ome (JP); Ryoji Ninomiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 11/509,654

(22) Filed: Aug. 25, 2006

(65) Prior Publication Data
US 2007/0048568 A1 Mar. 1, 2007

(51) Int. Cl.
*H01M 8/00* (2006.01)
*H01M 8/04* (2006.01)
*H01M 8/12* (2006.01)

(52) U.S. Cl. .............................. 429/13; 429/17; 429/22
(58) Field of Classification Search ................... 429/13, 429/17, 22
See application file for complete search history.

(56) References Cited

U.S. PATENT DOCUMENTS 6,214,487 B1 * 4/2001 Kelley et al. .................. 429/23
6,322,914 B1 * 11/2001 Chow et al. ................... 429/13

FOREIGN PATENT DOCUMENTS

| JP | 2001-332280 | 11/2001 |
|----|-------------|---------|
| JP | 2002-50378 | 2/2002 |
| JP | 2002-56857 | 2/2002 |
| JP | 2002-110199 | 4/2002 |
| JP | 2002-169629 | 6/2002 |
| JP | 2002-352828 | 12/2002 |
| JP | 2003-86192 | 3/2003 |
| JP | 2003-142137 | 5/2003 |
| JP | 2003-178762 | 6/2003 |
| JP | 2003-288136 | 10/2003 |
| JP | 2003-346850 | 12/2003 |

OTHER PUBLICATIONS

Notification of Transmittal of Translation of the International Preliminary Report on Patentability for Application No. PCT/JP2005/003705 dated Sep. 28, 2006.
International Preliminary Report on Patentability for Application No. PCT/JP2005/003705 dated Sep. 28, 2006.
Nikkei Business Publications, Inc., "Fuel Cell 2004", pp. 49, 50, and 64, (Oct. 2003).
Ikeda, "Everything in Fuel Cell", Nippon Jitsugyo Publishing Co. Ltd., pp. 210-213, (Aug. 2001).

* cited by examiner

*Primary Examiner*—Patrick Ryan
*Assistant Examiner*—Julian Mercado
(74) *Attorney, Agent, or Firm*—Finnegan, Henderson, Farabow, Garrett & Dunner, L.L.P.

(57) ABSTRACT

In a fuel cell unit, a control method therefor, and an information processing apparatus, a determination is made as to whether or not elapsed time from the last power generation until the present power generation has reached a predetermined time. When it is determined that the elapsed time has reached the predetermined time, setup processing for hydrating a solid polymer electrolyte membrane of a fuel cell is performed.

6 Claims, 9 Drawing Sheets

MAIN CONTROL COMMANDS FOR FUEL CELL UNIT

| NUMBER | COMMAND NAME | DESCRIPTION OF COMMAND |
|---|---|---|
| 1 | DMFC OPERATION ON REQUEST | "COMMAND TO START UP THE FUEL CELL UNIT FROM AN ELECTRONIC APPARATUS" |
| 2 | DMFC OPERATION OFF REQUEST | "COMMAND TO STOP THE FUEL CELL UNIT FROM AN ELECTRONIC APPARATUS" |
| 3 | DMFC FORCEFULLY STOP REQUEST | "COMMAND TO STOP THE FUEL CELL UNIT WITHOUT COOL DOWN PROCESSING" ON RECEIVING THIS COMMAND, THE FUEL CELL UNIT PERFORMS OPERATION STOP PROCESSING (CLOSING VALVES ETC.), AND SHIFT TO STANDBY STATE. |
| 4 | LB DETECTION PROCESSING REQUEST | "COMMAND TO NOTIFY THE LOW BATTERY STATE TO THE FUEL CELL UNIT BY DETECTING THE REMAINING CAPACITY OF THE SECONDARY BATTERY IN THE ELECTRONIC APPARATUS" FOR EXAMPLE, ON RECEIVING THIS COMMAND, THE FUEL CELL UNIT IS PROHIBITED TO SHIFT TO REFRESH STATE FROM ON STATE. |
| 5 | LB RELEASE PROCESSING REQUEST | "COMMAND TO NOTIFY THE FUEL CELL UNIT THAT THE LOW BATTERY STATE IS RELEASED BY DETECTING THE RECOVERY OF THE REMAINING CAPACITY OF THE SECONDARY BATTERY DUE TO THE POWER SUPPLY FROM THE FUEL CELL UNIT" FOR EXAMPLE, ON RECEIVING THIS COMMAND, THE PROHIBITION OF SHIFT FROM ON STATE TO REFRESH STATE IS CANCELED. |
| 6 | SETUP PROCESSING REQUEST | "COMMAND TO CAUSE THE FUEL CELL UNIT TO START SETUP PROCESSING" |
| 7 | SETUP PROCESSING STOP REQUEST | "COMMAND TO CAUSE THE FUEL CELL UNIT TO STOP SETUP PROCESSING" |

FIG. 9

MAIN POWER-SUPPLY INFORMATION OF THE FUEL CELL UNIT

| NUMBER | NAME OF POWER-SUPPLY INFORMATION | DESCRIPTION OF POWER-SUPPLY INFORMATION |
|---|---|---|
| 1 | DMFC OPERATING STATE | INFORMATION INDICATING THE CURRENT STATE OF THE FUEL CELL UNIT, THE STATE BEING ONE OF "STOP STATE", "STANDBY STATE", "WARM UP STATE", "ON STATE", "COOL DOWN STATE", AND "REFRESH STATE" |
| 2 | DMFC ABNORMAL STATE | INFORMATION INDICATING THE DETECTION RESULT OF NORMAL/ABNORMAL STATE IN THE FUEL CELL UNIT |
| 3 | FUEL CARTRIDGE CONNECTION STATE | INFORMATION INDICATING WHETHER OR NOT THE FUEL CARTRIDGE IS ATTACHED TO THE FUEL CELL UNIT |
| 4 | REMAINING FUEL STATE | INFORMATION INDICATING THAT FUEL IN THE FUEL CARTRIDGE IS LESS THAN THE PREDETERMINED AMOUNT |
| 5 | DMFC STACK OUTPUT CURRENT | INFORMATION INDICATING THE OUTPUT CURRENT OF THE DMFC STACK |
| 6 | DMFC STACK OUTPUT VOLTAGE | INFORMATION INDICATING THE OUTPUT VOLTAGE OF THE DMFC STACK |
| 7 | SETUP PROCESSING REQUIRED | INFORMATION INDICATING THAT THE FUEL CELL UNIT IS USED FOR THE FIRST TIME OR THE PERIOD BETWEEN PREVIOUSLY USED TIME AND PRESENT TIME IS MORE THAN PREDETERMINED PERIOD |
| 8 | SETUP PROCESSING COMPLETED | INFORMATION INDICATING THAT SETUP PROCESSING IS COMPLETED |

FIG. 10

FUEL CELL UNIT, CONTROL METHOD FOR FUEL CELL UNIT, AND INFORMATION PROCESSING APPARATUS

CROSS-REFERENCE TO RELATED APPLICATION

This application is based upon and claims the benefit of priority from PCT Application No. PCT/JP2005/003705 filed Feb. 25, 2005 and Japanese Patent Application No. 2004-54880, filed Feb. 27, 2004, the entire contents of which are incorporated herein by reference.

BACKGROUND

1. Field

The present invention relates to fuel cell units, control methods for fuel cell units, and information processing apparatuses. In particular, the present invention relates to a fuel cell unit for performing setup processing, a method for controlling the fuel cell unit and an information processing apparatus connected with the fuel cell unit.

2. Description of the Related Art

Currently, for example, lithium-ion batteries are used as secondary batteries, which are one type of power supply sources, for information processing apparatuses. One feature of the secondary batteries is that they can be repeatedly used upon being charged with, for example, a commercial power supply, as opposed to disposable primary batteries.

The lithium-ion batteries, however, requires a commercial power supply for charging, since they are secondary batteries.

In conjunction with remarkable improvements in the features and performance of information processing apparatuses in recent years, the power consumption of the information processing apparatuses are also on an upward trend. Thus, it is desired that the density of energy, i.e., the amount of energy output per unit volume or unit mass, provided by lithium ion batteries that supply power to the information processing apparatuses is increased. It is, however, difficult to expect a remarkable increase under the current situation.

In theory, the energy density of a fuel cell is said to be ten times as much as that of a lithium ion battery (for example, refer to "Fuel Cell 2004 (Nenryou-Denchi 2004)" Nikkei Business Publications, Inc., pp. 49-50 and pp. 64, October 2003, hereinafter referred to as Non Patent Document 1). This indicates that, when the fuel cell has the same volume or mass as the lithium battery, the fuel cell has the potential to supply power for a (e.g., ten times) longer period of time. Further, that also indicates that, when both have the same power-supply time, the fuel cell has the potential to be reduced in size and weight as compared to the lithium ion battery.

Further, with a fuel cell, fuel such as methanol can be encapsulated into a small container, and the replacement of the small package as a unit can eliminate the need for charging that uses an external power source. Thus, compared to a case a lithium-ion battery is used to supply power to an information processing apparatus at a place where no AC power-supply facility is available, the use of a fuel cell allows the information processing apparatus to operate for a long period.

Additionally, when an information processing apparatus (e.g., a notebook personal computer) using a lithium-ion battery is used for a long period of time, it is difficult for the information processing apparatus to operate on power supplied from the lithium-ion battery for a long period of time. Consequently, the use of the information processing apparatus is limited to an environment where power supply with an AC power source is available. In contrast, the use of a fuel cell to supply power to the information processing apparatus allows the information processing apparatus to operate for a longer period of time, compared to the case of using a lithium-ion battery, and can also provide the advantage of eliminating the above-noted limitation.

In view of the foregoing situation, fuel cells aimed to supply power to information processing apparatuses are under research and development. For example, relevant technologies are disclosed in Japanese Patent Application Publication (KOKAI) No. 2003-142137, Japanese Patent Application Publication (KOKAI) No. 2003-86192, and Japanese Patent Application Publication (KOKAI) No. 2002-169629.

Various types of fuel cell systems are available (e.g., refer to "Everything of Fuel Cell (Nenryoudenchi-no-subete)," Hironosuke Ikeda, Nippon Jitsugyo Publishing Co., Ltd., August 2001, hereinafter referred to as Non Patent Document 2). However, when compactness, lightweight, and the ease of handling of the fuel cell are considered, for example, a direct methanol fuel cell (DMFC) is suitable for information processing apparatuses. This fuel cell system uses methanol as a fuel and the methanol is directly introduced into a fuel cell electrode without being converted into hydrogen.

For the direct methanol fuel cell, the concentration of methanol introduced into the fuel electrode is important. A high concentration leads to decreased power generation efficiency, which makes it impossible to provide satisfactory performance. This is due to a phenomenon (called a crossover phenomenon) in which part of methanol, which is used as a fuel, passes through an electrolyte membrane (specifically, a solid polymer electrolyte membrane) sandwiched between the fuel electrode (a negative electrode) and an air electrode (a positive electrode). The crossover phenomenon becomes more pronounced for high-concentration methanol and is attenuated when low-concentration methanol is introduced into the fuel electrode.

On the other hand, when low-concentration methanol is used as a fuel, high performance can readily be ensured but the volume of the fuel is increased (e.g., by a factor of ten) compared to a case in which high-concentration methanol is used. Thus, the fuel container (i.e., the fuel cartridge) becomes large.

Accordingly, miniaturization can be achieved by encapsulating high-concentration methanol into the fuel cartridge. In addition, the crossover phenomenon can be reduced by causing small pumps, values, and so on to circulate water produced during power generation and reducing the concentration of the high-concentration methanol by dilution before the methanol is introduced into the fuel electrode. This system can also improve the power generation efficiency. Hereinafter, those pumps, valves, and so on for circulation will be referred to as "auxiliary sections" and such a system for circulation will be referred to as a "dilution circulation system".

Such an approach (as disclosed in Non Patent Document 1) can achieve a compact, lightweight fuel-cell unit having high power-generation efficiency.

Before problems to be solved by the invention are described, the principle of operation of a fuel cell will be briefly described first. Since the principle of operation is already described in detail in known documents (e.g., Non Patent Document 1 mentioned above), an overview of the principle will now be described.

Figure 1:
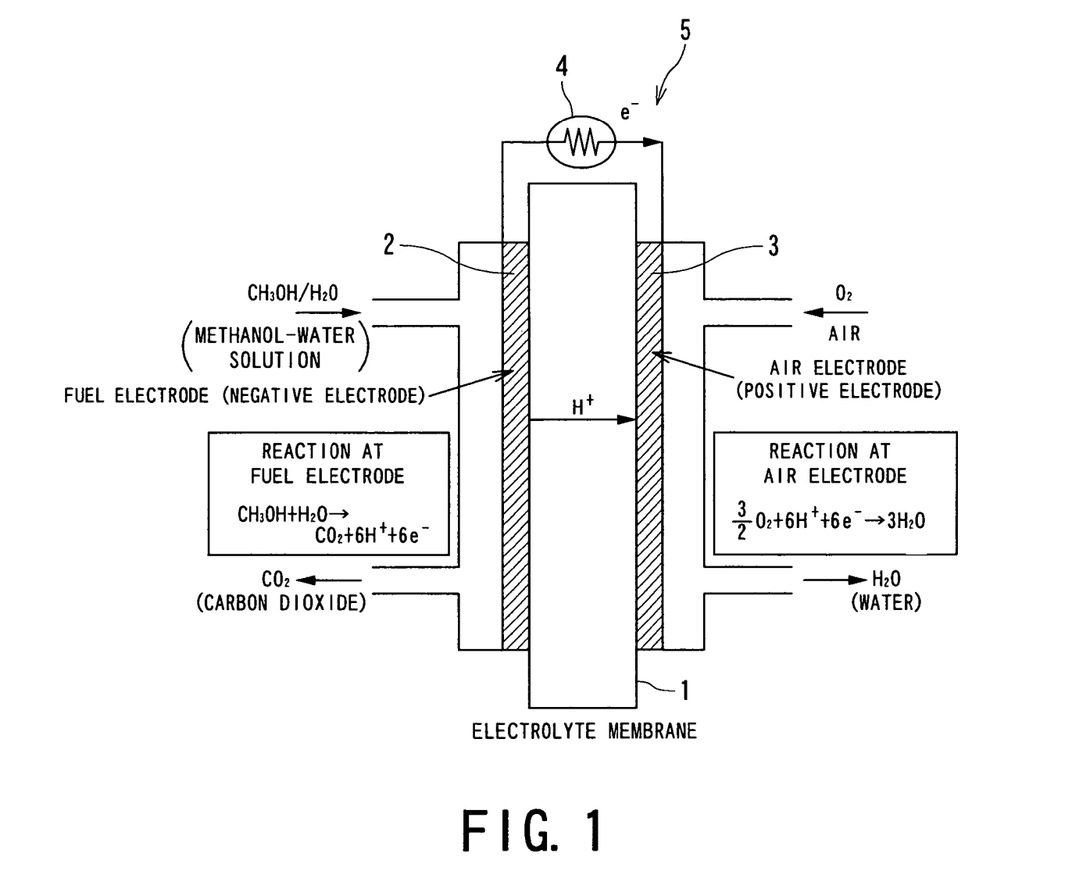
FIG. 1 illustrates the principle of operation of a direct methanol fuel cell (DMFC)

FIG. 1 illustrates the principle of operation of a direct methanol fuel cell (DMFC) 5. In the DMFC 5, an electrolyte membrane 1 is arranged at the center and is sandwiched by a fuel electrode (a negative electrode) 2 and an air electrode (a positive electrode) 3 from two opposite sides.

When a methanol-water solution is introduced into one end of the fuel electrode 2 of the DMFC 5, oxidation reaction of methanol occurs at the fuel electrode 2. As a result, electrons ($e^-$), hydrogen ions ($H^+$), and carbon dioxide ($CO_2$) are generated. The hydrogen ions ($H^+$) pass through the electrolyte membrane 1 to reach the air electrode 3. The carbon dioxide ($CO_2$) is exhausted from another end of the fuel electrode 2.

The electrons ($e^-$) circulate from the fuel electrode 2 to the air electrode 3 via a load 4. The flow of the electrons enables power to be supplied to an external apparatus. At the air electrode 3, oxygen ($O_2$) in the air that is externally introduced reacts with the hydrogen ions ($H^+$) that has passed through the electrolyte membrane 1 and the electrons ($e^-$) that have circulated via the load 4, so that water $H_2O$ (water vapor) is produced.

FIG. 1 illustrates only one unit of the fuel cell structure, and, in practice, a plurality of DMFCs 5 are stacked to provide a predetermined voltage and current. The stack of the DMFCs 5 is called a "DMFC stack".

In direct methanol fuel cells, a solid polymer electrolyte membrane is typically used as the electrolyte membrane 1. It is well known to those skilled in the art, as discussed in Japanese Patent Application Publication (KOKAI) No. 2003-86192, that when the solid polymer electrolyte membrane is dried, for example, after being left unused for a long period, the membrane does not serve as an electrolyte. That is, the solid polymer electrolyte membrane displays conductivity with respect to hydrogen ions ($H^+$) when hydrated, but becomes an isolator with respect to hydrogen ions ($H^+$) when dried and thus does not serve as an electrolyte.

Thus, when the fuel cell unit is used for the first time after shipment or is left unused for a long period after the stopping of power generation, the power-generation capability of the fuel cell unit may decrease due to the dried solid polymer electrolyte membrane.

In order to prevent the decrease in power-generation capability, special processing called setup processing may be performed. The setup processing refers to hydration processing for sufficiently hydrating the solid polymer electrolyte membrane when the fuel cell unit is used for the first time or is left unused for a long period of time, for example, for one year. In the setup processing, moisture is introduced into the dried fuel electrode by operating the liquid feed pump(s) of the auxiliary sections for a certain period of time.

The setup processing is aimed to hydrate the solid polymer electrolyte member but is not to generate power. Also, the processing is not necessarily required every time the fuel cell unit is used. Thus, a specific sequence, which is different from an ordinary operation sequence, can be set for the setup processing. This allows the processing for hydrating the solid polymer electrolyte membrane to be efficiently performed only when necessary.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

A fuel cell unit, a control method therefor, and an information processing apparatus according to embodiments of the present invention will now be described with reference to the accompanying drawings.

Figure 2:
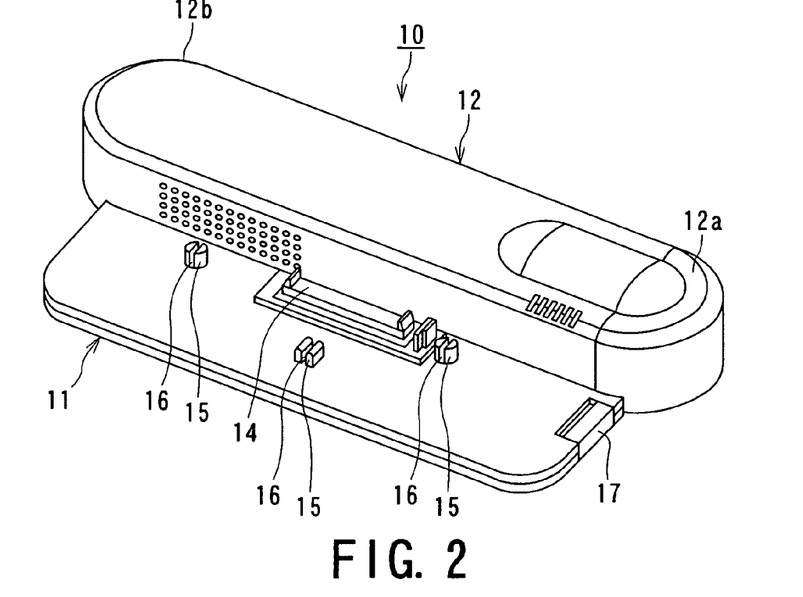
FIG. 2 is a perspective view showing a fuel cell unit according to the present invention.

FIG. 2 is a perspective view showing a full cell unit of the present invention. As shown in FIG. 2, a fuel cell unit 10 has a fuel cell unit body 12 and a placement portion 11 on which a rear portion of an information processing apparatus, such as a notebook personal computer, is placed. The fuel cell unit body 12 includes a DMFC (direct methanol fuel cell) stack for generating power through electrochemical reaction and auxiliary sections (such as pumps and valves) for circulating and feeding air and methanol acting as fuel into the DMFC stack.

The fuel cell unit body 12 also has a cover 12a and a unit casing 12b. The unit casing 12b contains a removable fuel cartridge (not shown) at, for example, the right edge thereof. The cover 12a is removably provided so as to allow replacement of the fuel cartridge.

An information processing apparatus is placed on the placement portion 11. The upper surface of the placement portion 11 has a docking connector 14 that serves as a connection portion for connection with the information processing apparatus. For example, a rear portion of the bottom surface of the information processing apparatus has a docking connector 21 (not shown) that serves as a connection portion for connection with the fuel cell unit 10. The docking connector 21 is mechanically and electrically connected with the docking connector 14 of the fuel cell unit 10. Three pairs of a locating projection 15 and a hook 16 are provided at respective spots on the placement portion 11. Correspondingly, the information processing apparatus also has three holes in rear portion of the bottom surface. The locating projections 15 and the hooks 16 are inserted into the corresponding three holes of the information processing apparatus.

For removal of the information processing apparatus from the fuel cell unit 10, depressing an eject button 17 of the fuel cell unit 10 shown in FIG. 2 causes a lock mechanism (not shown) to be released so that the fuel cell unit 10 can be easily removed.

Figure 3:
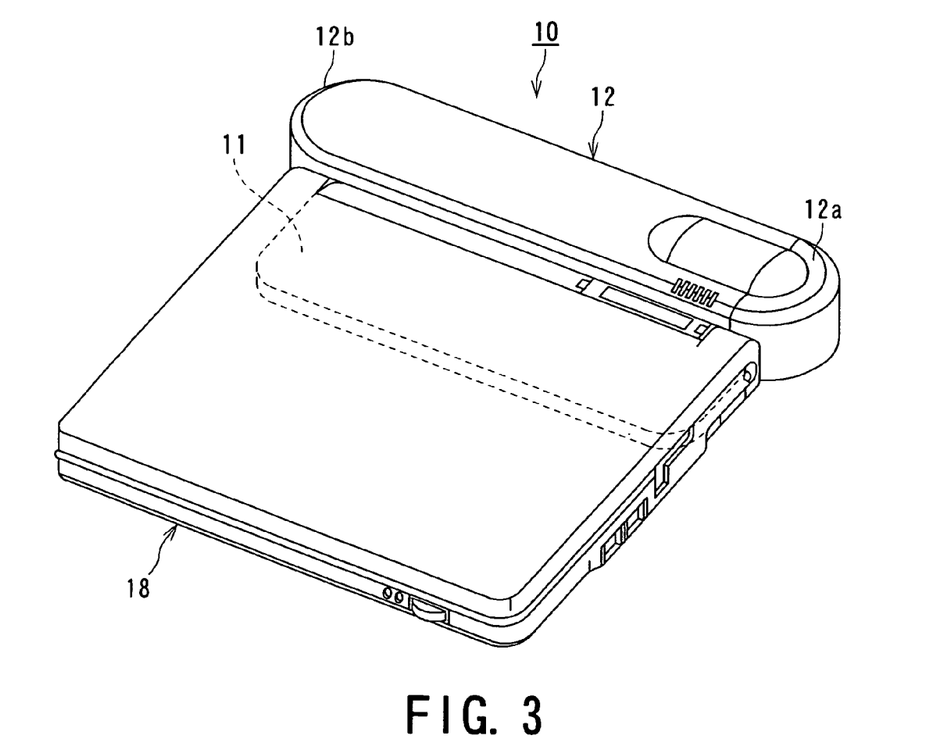
FIG. 3 is a perspective view showing a state in which an information processing apparatus according to the present invention is connected with the fuel cell unit.

FIG. 3 is a perspective view showing an information processing apparatus 18 (e.g., a notebook personal computer) that is placed on and connected with the placement portion 11 of the fuel cell unit 10.

The fuel cell unit 10 shown in FIGS. 2 and 3 may have any shape and size and the docking connector 14 may also take various forms in terms of the shape and position.

The configuration of the fuel cell unit 10 according to the present invention will be described next. In particular, a DMFC stack and auxiliary sections provided around the DMFC stack will be described in detail with reference to the schematic diagram shown in FIG. 4.

Figure 4:
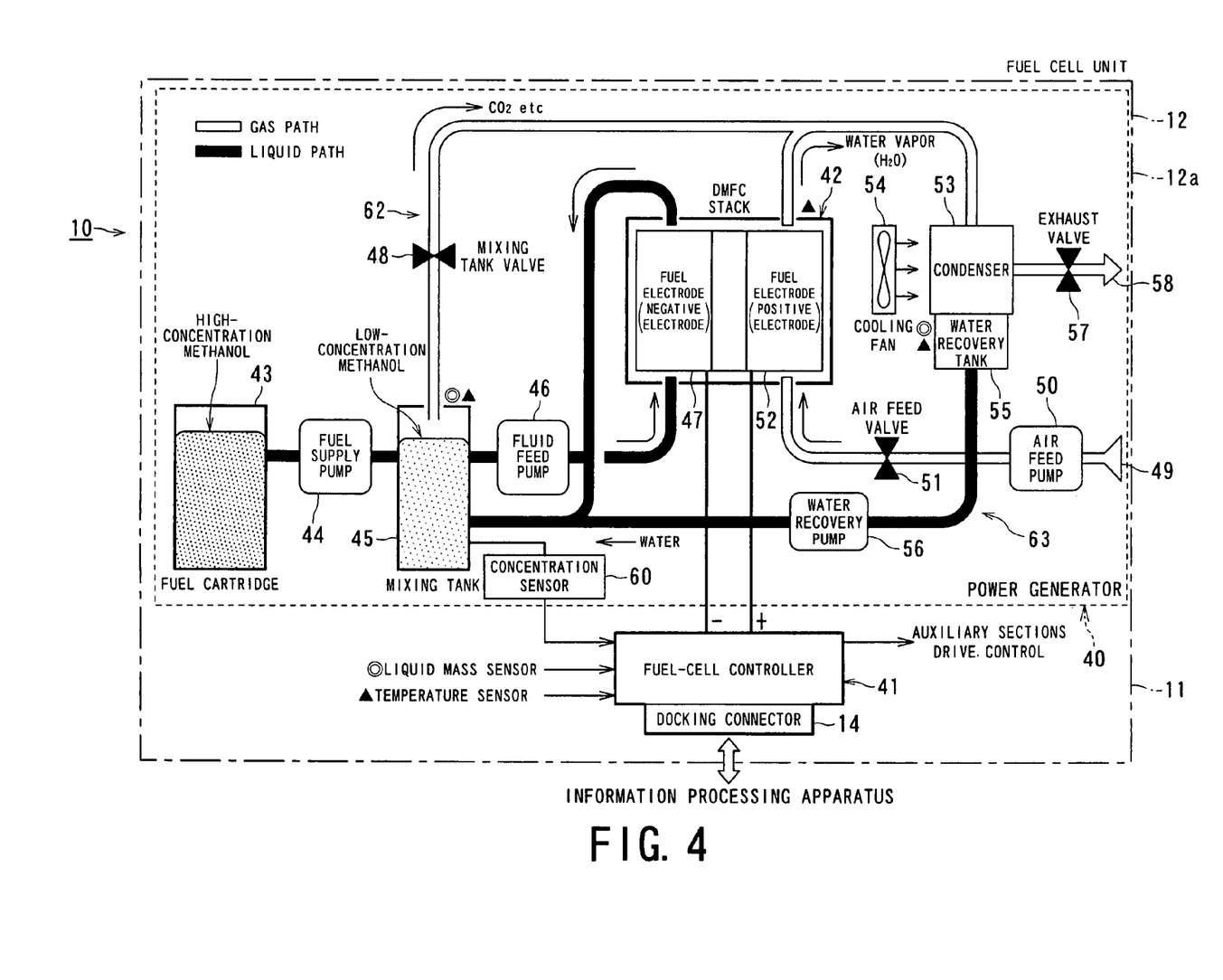
FIG. 4 is a schematic diagram mainly showing a power generator of the fuel cell unit.

The fuel cell unit 10 includes a power generator 40 and a fuel-cell controller 41, which serves as a control unit for the fuel cell unit 10. As well as controlling the power generator 40, the fuel-cell controller 41 serves as a communication controller for communicating with the information processing apparatus 18.

The power generator 40 has a DMFC stack 42 that plays a central roll in power generation and a fuel cartridge 43 that contains methanol to be used as a fuel. High-concentration methanol is encapsulated in the fuel cartridge 43. The fuel cartridge 43 is removably provided so as to allow easy replacement when the fuel is consumed.

In general, direct methanol fuel cells need to reduce the crossover phenomenon to improve the power-generation efficiency. For this purpose, it is effective to dilute high-concentration methanol to provide low-concentration methanol and then to introduce the methanol into a fuel electrode 47. To achieve this approach, the fuel cell unit 10 employs a dilution circulation system 62. Thus, the power generator 40 includes auxiliary sections 63, which are needed to provide the dilution circulation system 62. More specifically, the auxiliary sections 63 are constituted by a fuel supply pump 44, a mixing tank 45, a fluid feed pump 46, a mixing-tank valve 48, an air feed pump 50, an air feed valve 51, a condenser 53, a cooling fan 54, a water recovery tank 55, a water recovery pump 56, an exhaust valve 57, and so on. Those pumps, valves, and so on are connected through a pipe or pipes.

The power-generation mechanism of the power generator 40 in the fuel cell unit 10 will now be described with reference to the flow of fuel and air (oxygen).

The high-concentration methanol in the fuel cartridge 43 is introduced by the fuel supply pump 44 into the mixing tank 45. The high-concentration methanol in the mixing tank 45 is diluted by being mixed with recovered water and low-concentration methanol (residue of power-generation reaction) from the fuel electrode 47, so that low-concentration methanol is generated. The concentration of the low-concentration methanol is controlled to be maintained at a concentration (e.g., 3 to 6%) that provides high power-generation efficiency. For the control, for example, the amount of high-concentration methanol that the fuel supply pump 44 supplies to the mixing tank 45 may be regulated based on information from a concentration censor 60. Alternatively, the amount of water circulating into the mixing tank 45 may be controlled by the water recovery pump 56 or the like.

Methanol-water solution diluted in the mixing tank 45 is pressurized by the liquid feed pump 46 and the resulting solution in introduced into the fuel electrode (i.e., a negative electrode) 47 of the DMFC stack 42. At the fuel electrode 47, a methanol oxidation reaction occurs, so that electrons are generated. Hydrogen ions ($H^+$) generated from the oxidation reaction pass through a solid polymer electrolyte membrane 422 in the DMFC stack 42 to reach an air electrode (i.e., a positive electrode) 52.

On the other hand, carbon dioxide is generated as a result of the oxidation reaction occurred at the fuel electrode 47. The carbon dioxide is circulated back into the mixing tank 45 together with methanol-water solution that was not used for reaction. The carbon dioxide is vaporized in the mixing tank 45. The vapor is then directed to the condenser 53 via the mixing tank valve 48 and is eventually exhausted from an exhaust outlet 58 via the exhaust valve 57.

On the other hand, air (oxygen) flow is introduced from an inlet 49 and is pressurized by the air feed pump 50. The resulting air is introduced into to the air electrode (i.e., positive electrode) 52 via the air feed valve 51. At the air electrode 52, oxygen ($O_2$) reduction reaction progresses, so that water ($H_2O$) is generated, as water vapor, from electrons ($e^-$) from an external load, hydrogen ions ($H^+$) from the fuel electrode 47, and oxygen ($O_2$). The water vapor is discharged from the air electrode 52 and enters the condenser 53. In the condenser 53, the water vapor is cooled down by the cooling fan 54 to turn into water (liquid), which is temporarily stored in the water recovery tank 55. The recovered water is circuited by the water recovery pump 56 into the mixing tank 45. The above-described mechanism provides the dilution circulation system 62 for diluting high-concentration methanol.

As can be understood from the power-generation mechanism of the fuel cell unit 10 employing the dilution circulation system 62, in order to start power extraction from the DMFC stack 42, i.e., to start power generation, the auxiliary sections 63, which are constituted by the individual pumps 44, 46, 50, and 56, valves 48, 51, and 57, the cooling fan 54, and so on, are actuated. As a result, the methanol-water solution and water (oxygen) are introduced into the DMFC stack 42, where electrochemical reaction progresses to thereby provide power. On the other hand, in order to stop the power generation, the actuation of the auxiliary sections 63 is stopped.

The pumps 44, 46, 50, and 56 and valves 48, 51, and 57 in the fuel cell unit 10 are arranged at a plurality portions in the power generator 40 to thereby constitute the dilute circulation system 62. Thus, appropriately controlling the activation of the auxiliary sections 63 so as to synchronize with each other is particularly important not only for the starting and stopping of power generation but also for a case in which, for example, the load of the information processing apparatus 18 varies and/or an abnormal state occurs during power generation. The auxiliary sections 63 are controlled by the fuel-cell controller 41 of the fuel cell unit 10.

Further, setup processing for recovering the power-generation capability is also accomplished by the fuel cell controller 41 controlling the auxiliary sections 63.

Details of operation of the fuel-cell controller 41 will now be described with reference to FIGS. 5 to 10.

Figure 5:
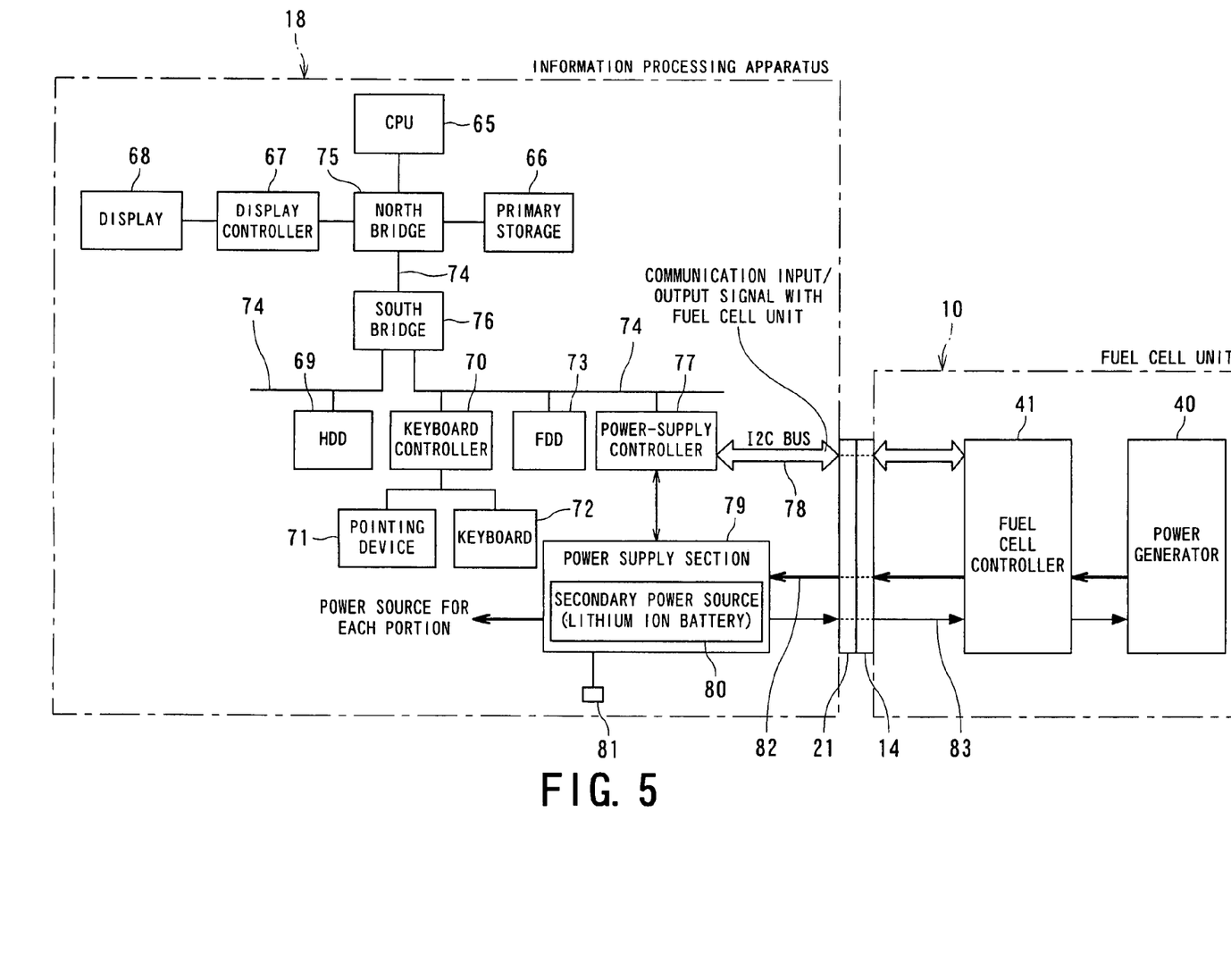
FIG. 5 is a schematic diagram showing a state in which the information processing apparatus is connected with the fuel cell unit.

FIG. 5 schematically shows the information processing apparatus 18 as one example of an information processing apparatus that is capable of communicating with the fuel-cell controller 41 provided in the fuel cell unit 10. The information processing apparatus 18 includes a central processing unit (CPU) 65, a primary storage 66, a display controller 67, a display 68, a hard disk drive (HDD) 69, a keyboard controller 70, a pointing device 71, a keyboard 72, and a floppy™ disk drive (FDD) 73. The information processing apparatus further includes a bus 74 for transferring signals between those devices, a north bridge 75 and a south bridge 76 for converting a signal sent via the bus 74, and so on. The information processing apparatus 18 has an internal power-supply section 79, in which a secondary battery 80, such as a lithium-ion battery, is included. The power supply section 79 is controlled by a power-supply controller 77.

A control-system interface and a power-supply-system interface are provided as electrical interfaces between the fuel cell unit 10 and the information processing apparatus 18. The control-system interface allows the power-supply controller 77 of the information processing apparatus 18 and the fuel-cell controller 41 of the fuel cell unit 10 to communicate with each other via a serial bus, such as an inter-integrated circuit ($I^2C$) bus 78.

The power-supply-system interface is provided to transmit power between the fuel cell unit 10 and the information processing apparatus 18. For example, power generated by the DMFC stack 42 in the power generator 40 is supplied to the information processing apparatus 18 via the fuel-cell controller 41 and the docking connectors 14 and 21. The power-supply-system interface also supplies power 83 from the power-supply section 79 of the information processing apparatus 18 to the auxiliary sections 63 and so on in the fuel cell unit 10.

Power is converted from alternate current (AC) to direct current (DC) via the AC-adapter connector 81 and the resulting direct-current power is supplied to the power-supply section 79 of the information processing apparatus 18. The direct-current power supply enables the operation of the information processing apparatus 18 and the charging of the secondary battery (e.g., a lithium-ion battery) 80.

Figure 6:
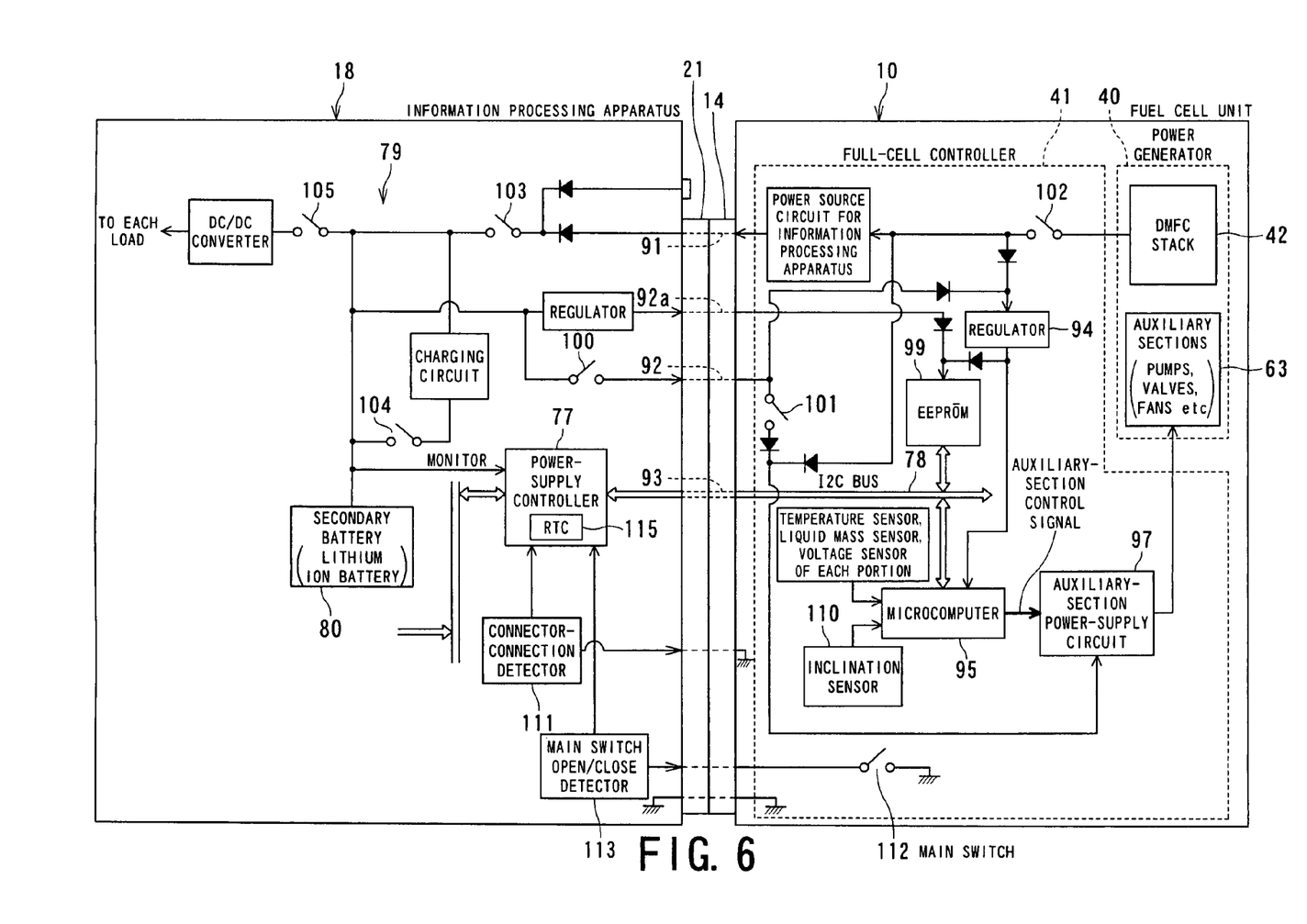
FIG. 6 is a schematic diagram illustrating a first embodiment of the fuel cell unit and the information processing apparatus.

FIG. 6 is a diagram showing the relationship in electrical functions between the fuel-cell controller 41 of the fuel cell unit 10 and the power-supply section 79 of the information processing apparatus 18 according to a first embodiment.

The fuel cell unit 10 and the information processing apparatus 18 are mechanically and electrically connected via the docking connectors 14 and 21. The docking connectors 14 and 21 have a first power-supply (an output power-supply terminal) 91, a second power-supply terminal (an auxiliary-section input power-supply terminal) 92, and a third power-supply terminal 92a. More specifically, the first power-supply terminal 91 feeds power generated by the DMFC stack 42 of the fuel cell unit 10 to the information processing apparatus 18, and the second power-supply terminal 92 feeds power from the information processing apparatus 18 to a microcomputer 95 of the fuel cell unit 10 via a regulator 94 and also to an auxiliary-section power-supply circuit 97 via a switch 101. The third power-supply terminal 92a feeds power from the information processing apparatus 18 to an EEPROM (electrically erasable programmable read-only memory) 99.

The docking connectors 14 and 21 further have an input/output terminal 93 for communication. Examples of the communication includes communication between the power-supply controller 77 of the information processing apparatus 18 and the microcomputer 95 of the fuel cell unit 10 and communication between the power-supply controller 77 and, preferably, a writable nonvolatile memory (e.g., an EEPROM) 99.

Next, the flow of basic processing in which power generated by the DMFC stack 42 is supplied from the fuel cell unit 10 to the information processing apparatus 18 will be described with reference to FIG. 6 and the state transition diagram (for the fuel cell unit 10) shown in FIG. 7. Thereafter, setup processing will be described.

It is assumed that the secondary battery (e.g., a lithium-ion battery) 80 of the information processing apparatus 18 is charged with predetermined power. It is also assumed that all switches shown in FIG. 6 are open.

First, the power-supply controller 77 of the information processing apparatus 18 recognizes that the information processing apparatus 18 and the fuel cell unit 10 are mechanically connected via the docking connectors 14 and 21, in accordance with a signal sent from a connector-connection detector 111.

When the information processing apparatus 18 and fuel cell unit 10 are mechanically connected via the docking connectors 14 and 21, the information processing apparatus 18 supplies power to the nonvolatile memory (i.e., an EEPROM) 99, which serves as a storage for the fuel-cell controller 41, via the third power-supply terminal 92a. The EEPROM 99 pre-stores identification information and so on of the fuel cell unit 10. The pre-stored identification information may include the component code or the manufacture serial number of the fuel cell unit, rated output information, and so on. The EEPROM 99 is connected to the serial bus 78, such as an $I^2C$ bus. Data stored in the EEPROM 99 can be read while power is supplied to the EEPROM 99. In the configuration shown in FIG. 6, the power-supply controller 77 can read information from the EEPROM 99 via the communication input/output terminal 93.

In this state, the fuel cell unit 10 has not generated power yet and power is not supplied to the inside of the fuel cell unit 10 except for power supplied to the EEPROM 99. This state corresponds to a "stop state" ST 10 in the state transition diagram shown in FIG. 7.

Figure 7:
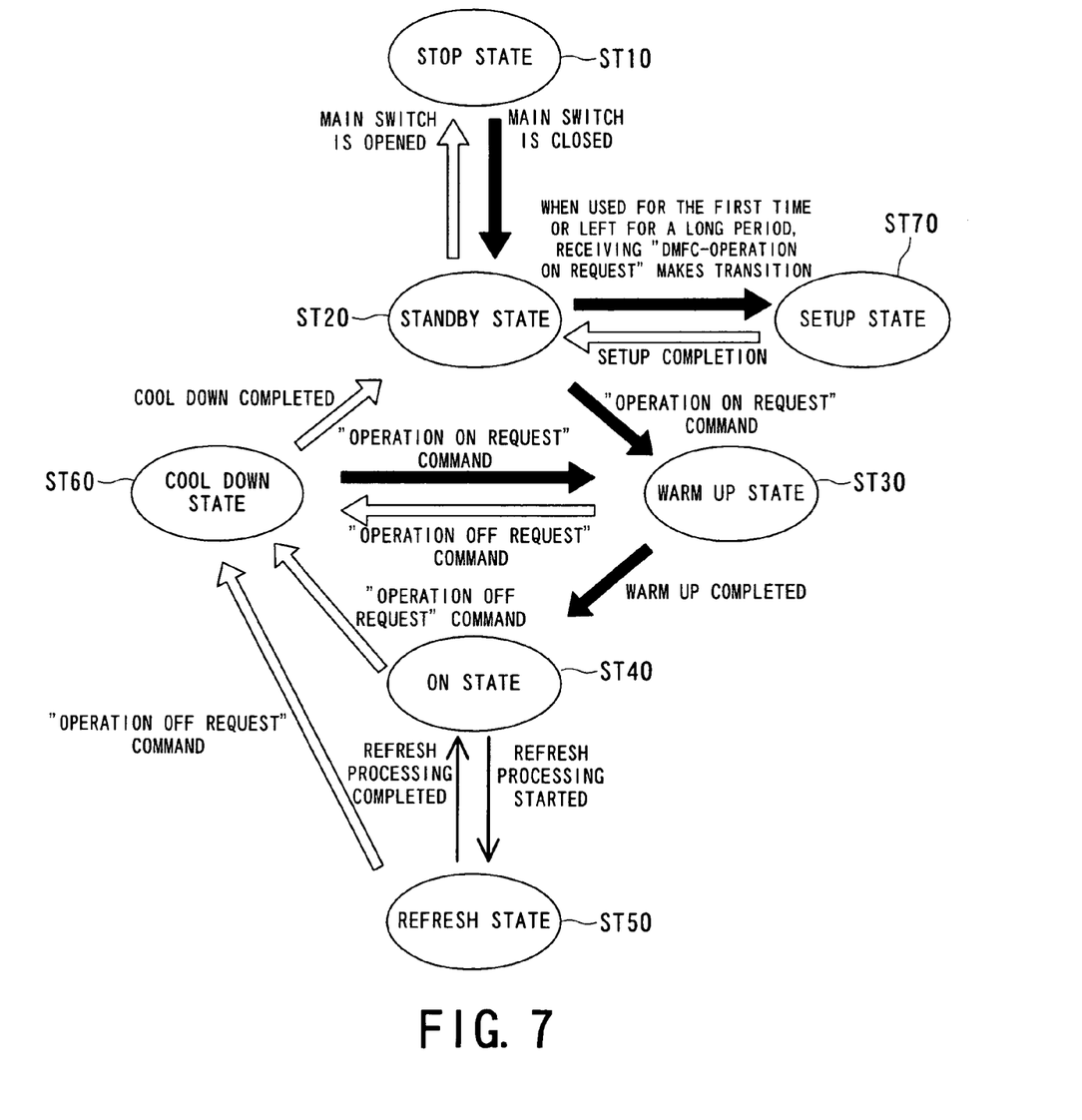
FIG. 7 is a state transition diagram of a fuel cell unit that performs setup processing.

When a main switch 112 provided at the fuel cell unit 10 is closed during the "stop state" ST 10, flow proceeds to a "standby state" ST 20 shown in FIG. 7. The main switch 112 may be a slide switch and is provided, for example, outside the fuel cell unit 10 so as to be opened or closed by a user.

When the main switch 112 is closed, a signal is sent from a main-switch open/close detector 113 of the information processing apparatus 18. In response to the signal, the power-supply controller 77 of the information processing apparatus 18 recognizes the closing of the main switch 112. Next, the power-supply controller 77 reads the identification information of the fuel cell unit 10 via the $I^2C$ bus 78, the identification information being stored in the EEPROM 99 of the fuel cell unit 10. When the power-supply controller 77 determines based on the read identification information that the connected fuel cell unit 10 is compatible with the information processing apparatus 18, the power-supply controller 77 closes a switch 100.

When the switch 100 is closed, power from the secondary battery 80 of the information processing apparatus 18 is supplied to the microcomputer 95 of the fuel-cell controller 41 via the second power-supply terminal 92. This state corresponds to the "standby state" ST 20. At this stage, no power is supplied to the auxiliary-section power-supply circuit 97 and thus the auxiliary sections 63 are not in operation.

However, the microcomputer 95 is in operation, so that, in this state, the fuel cell unit 10 can receive various control commands from the power-supply controller 77 of the information processing apparatus 18 via the $I^2C$ bus 78. Conversely, in this state, the fuel cell unit 10 can also transmit power-supply information of the fuel cell unit 10 to the information processing apparatus 18 via the $I^2C$ bus 78.

Figure 9:
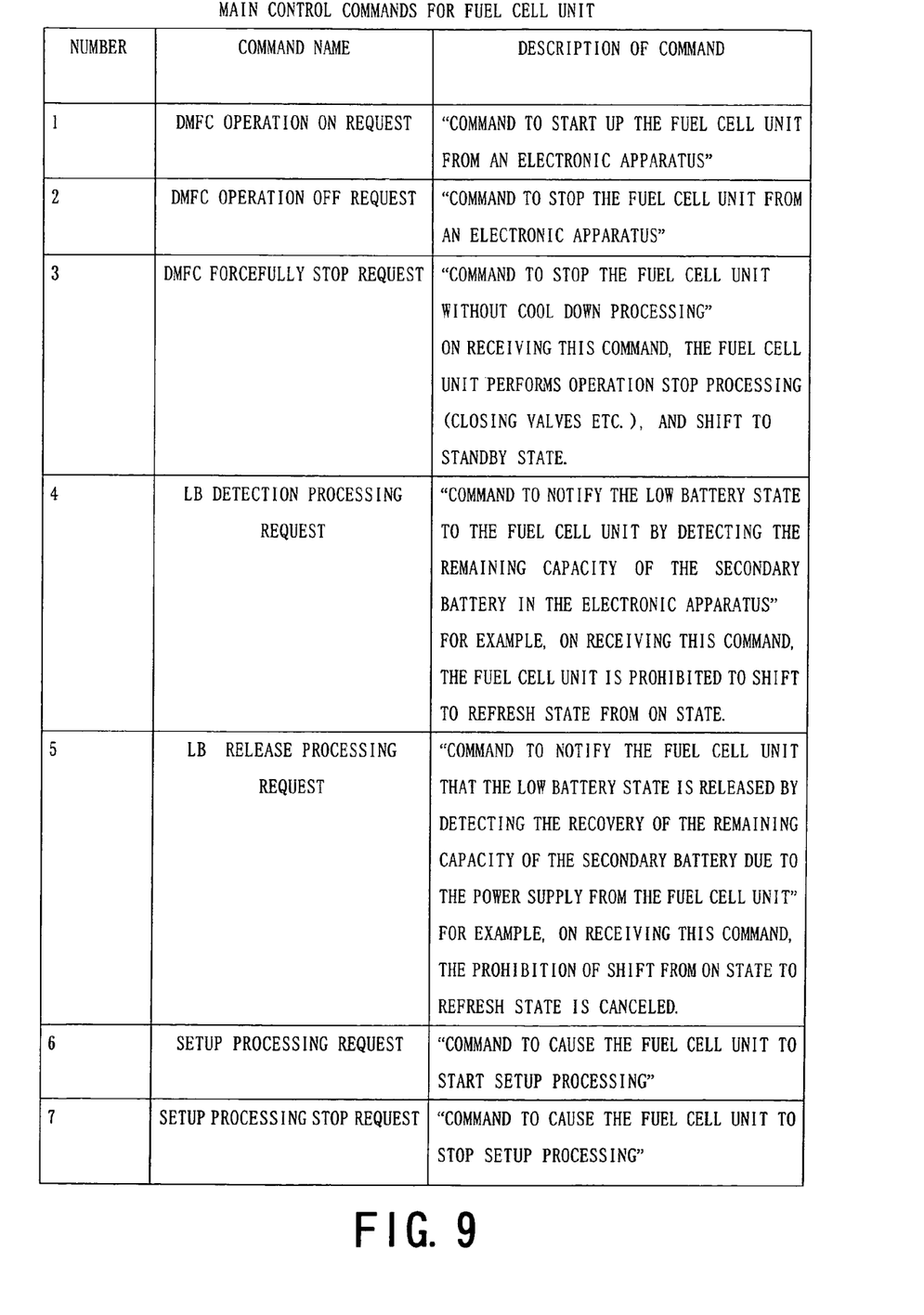
FIG. 9 is a table showing main control commands for the fuel cell unit according to the present invention.

FIG. 9 is a table showing examples of the control commands transmitted from the power-supply controller 77 of the information processing apparatus 18 to the microcomputer 95 of the fuel-cell controller 41.

Figure 10:
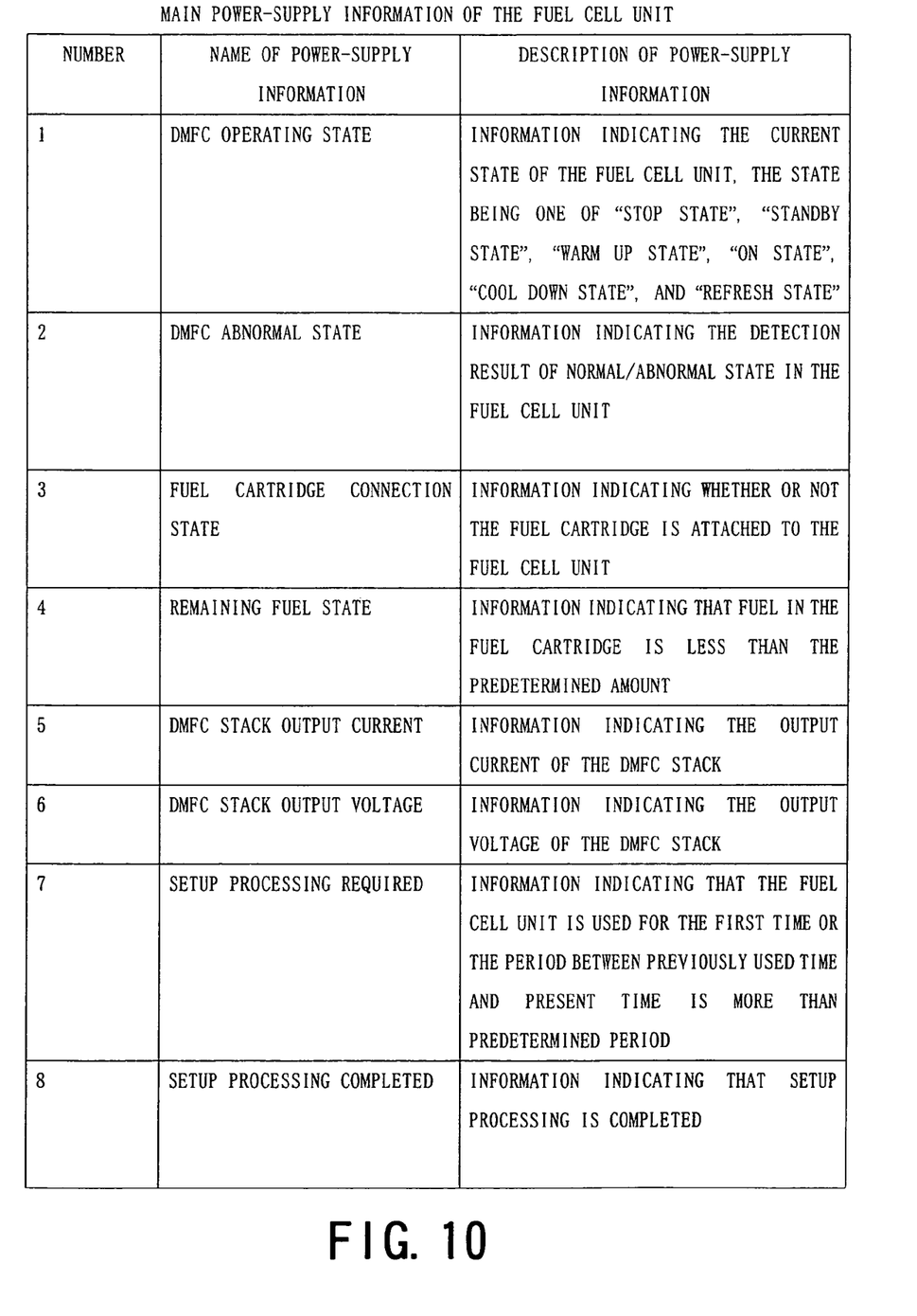
FIG. 10 is a table showing main power-supply information of the fuel cell unit according to the present invention.

FIG. 10 is a table showing examples of main power-supply information of the fuel cell unit 10 transmitted from the microcomputer 95 of the fuel-cell controller 41 to the power-supply controller 77 of the information processing apparatus 18.

The power-supply controller 77 of the information processing apparatus 18 can recognize the fuel cell unit 10 is in the "standby state" ST20, by reading a "DMFC operation state" of the power-supply information shown in FIG. 10.

During the "standby state" ST20, when the power-supply controller 77 transmits a "DMFC-operation ON request" command of the control commands shown in FIG. 10 to the fuel-cell controller 41, the fuel-cell controller 41 receives that command and changes the state of the fuel cell unit 10 to a "warmup state" ST30.

Specifically, under the control of the microcomputer 95, the switch 101 of the fuel-cell controller 41 is closed and power from the information processing apparatus 18 is supplied to the auxiliary-section power-supply circuit 97. In addition, the microcomputer 95 outputs an auxiliary-section control signal, which actuates the auxiliary sections 63 (i.e., the pumps, 44, 46, 50, and 56, the valves 48, 51, and 57, the cooling fan 54, and so on shown in FIG. 4) provided in the power generator 40. Further, the microcomputer 95 closes a switch 102 of the fuel-cell controller 41.

Consequently, the methanol-water solution and air are introduced into the DMFC stack 42 of the power generator 40 to thereby initiate power generation. The supply of the power generated by the power generator 40 to the information processing apparatus 18 is also started. Since the output of the generated power does not reach a rated value instantaneously, the state until the output reaches the rated value is referred to as the "warmup state" ST30.

The microcomputer 95 of the fuel-cell controller 41 determines whether or not the output from the DMFC stack 42 reaches the rated value, by monitoring, for example, a voltage output from the DMFC stack 42 and the temperature of the DMFC stack 42. Upon determining that the output from the DMFC stack 42 reaches the rated value, the microcomputer 95 opens the switch 101 to switch the power supply source for the auxiliary sections 63 from the information processing apparatus 18 to the DMFC stack 42. This state is referred to as an "ON state" ST 40.

What is described above is an overview of the flow of the basic processing from the "stop state" ST10 to the "ON state" ST40.

Setup processing and a "setup state" ST70 will be described next.

The setup processing refers to processing for hydrating a dried solid polymer electrolyte membrane, for example, when the fuel cell unit 10 is used for the first time or is left unused for a long period of time. This processing is aimed to recover a decreased power-generation capability. While various specific methods for the setup processing are possible, a typical method will first be described with reference to the schematic diagram in FIG. 6, the state transition diagram in FIG. 7, and the flow chart in FIG. 8.

Figure 8:
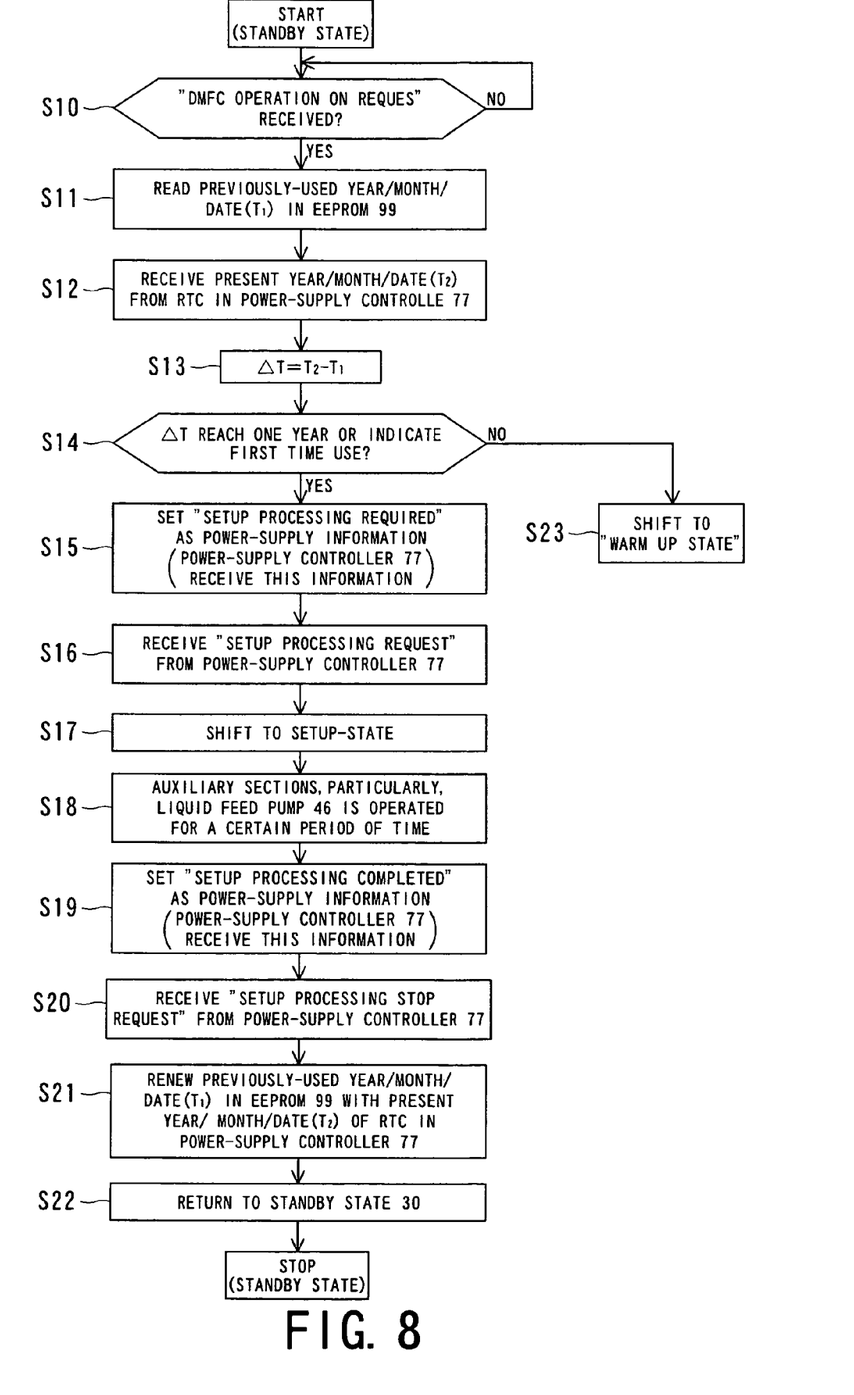
FIG. 8 is a flow chart of the setup processing.

As shown in the state transition diagram in FIG. 7 and the flow chart in FIG. 8, the setup state ST70 branches from the standby state ST20.

In the standby state ST20, power is supplied from the information processing apparatus 18 to the microcomputer 95 of the fuel-cell controller 41 via the second power-supply terminal (i.e., the auxiliary-section input power-supply terminal) 92, so that the microcomputer 95 is operable.

Also, power is supplied from the information processing apparatus 18 to the EEPROM 99 of the fuel-cell controller 41 via the third power-supply terminal 92a, so that the EEPROM 99 is operable. Thus, the microcomputer 95 can read information written in the EEPROM 99.

However, the switch 101 of the fuel-cell controller 41 is still open and thus no power is supplied to the auxiliary sections 63. In this state, therefore, the auxiliary sections 63 are not actuated and, naturally, the DMFC stack 42 does not generate power.

Referring to the flow chart shown in FIG. 8, first, in step S10, the microcomputer 95 monitors control-command data, on the IC2 bus 78, that is transmitted from the power-supply controller 77 of the information processing apparatus 18 via the communication input/output terminal 93. Main control commands are, for example, those shown in FIG. 9.

When it is determined that a control command indicating a "DMFC operation ON request" (i.e., the command shown at number "1" in FIG. 9) is received (Yes in step S10), in step S11, the microcomputer 95 reads the value of previously-used year/month/date ($T_1$) stored in the EEPROM 99. Further, in step S12, the microcomputer 95 receives present year/month/date ($T_2$) via the I²C bus 78 from means, provided in the power-supply controller 77 of the information processing apparatus 18, for generating information indicating present time. The microcomputer 95 then reads the year/month/date ($T_2$). The means for generating the time information is, for example, a real-time clock (RTC) 115.

Typically, information processing apparatuses, particularly, notebook personal computers and so on, have built-in real-time clocks to support various types of time-related processing. Thus, the use of information of such a real-time clock for the fuel-cell controller 41 can simplify the configuration thereof. Accordingly, in the configuration of the present embodiment, the fuel-cell controller 41 receives data of the real-time clock 115 in the information processing apparatus 18 and the microcomputer 95 reads the data.

Although the real-time clock 115 in the embodiment illustrated in FIG. 6 is provided in the power-supply controller 77 of the information processing apparatus 18, a modification is also possible to the configuration. For example, the real-time clock 115 may be provided in the keyboard controller 70 or the like of the information processing apparatus 18.

In step S13, the microcomputer 95 of the fuel-cell controller 41 determines a difference $\Delta T$ between the previously-used year/month/date ($T_1$) and the present year/month/date ($T_2$). The difference $\Delta T$ indicates elapsed time from when the fuel cell unit 10 was used last time until it is used this time.

Next, in step S14, a determination is made as to whether or not $\Delta T$ reaches a predetermined time, for example, one year, or whether or not the fuel cell unit 10 is used for the first time. Whether or not the fuel cell unit 10 is used for the first time can be determined by a method, such as setting the value of the previously-used year/month/date ($T_1$) stored in the EEPROM 99 to zero during the shipment of the fuel cell unit 10. For a subsequent use, a value other than zero, i.e., actual year/month/date, is stored for $T_1$.

When it is determined that $\Delta T$ reaches a predetermined time, for example, one year, or it is determined that the fuel cell unit 10 is used for the first time, information indicating the necessity of setup processing is sent to the power-supply controller 77 of the information processing apparatus 18. Specifically, in step S15, information indicating, for example, "setup processing required" (see number 7 in FIG. 10) is set as power-supply information for the fuel cell unit 10 and power-supply controller 77 of the information processing apparatus 18 receives and reads the information. In this manner, the information can be sent to the power-supply controller 77.

Thereafter, in step S16, the power-supply controller 77 transmits a "setup processing required" command (see number 6 in FIG. 9), as one control command, to the fuel-cell controller 41.

The fuel-cell controller 41 receives the command and shifts the state of the fuel cell unit 10 to a "setup state" ST70 in step S17. In step S18, particularly, the liquid feed pump 46 of the auxiliary sections 63 in the fuel cell unit 10 is operated for a certain period of time, so that the solid polymer electrolyte membrane 422 in the DMFC stack 42 is hydrated.

As a result, the solid polymer electrolyte membrane 422 that has been dried absorbs moisture and the DMFC stack 42 recovers, i.e., increases, its power-generation capability.

After the operation of the liquid feed pump 46 for a certain period of time is completed, in step S19, the fuel-cell controller 41 issues a notification indicating the setup-processing completion to the power-supply controller 77 of the information processing apparatus 18. This method is made possible by setting, for example, "setup processing completion" (number 8 in FIG. 10) as the power-supply information.

In step S20, the power-supply controller 77 reads the "setup processing completion" of the power-supply information and returns a "setup processing completion request" command, acting as a command for permitting the completion of the setup processing, to the fuel-cell controller 41.

In step S21, the fuel-cell controller 41 renews the previously-used year/month/date ($T_1$) stored in the EEPROM 99 with the present year/month/date ($T_2$) of the real-time clock 115 of the power-supply controller 77. In step S22, flow returns to the standby state ST30.

What is described above is the basic flow of the setup processing.

In the first embodiment illustrated in FIG. 6, during the setup processing, the auxiliary sections 63, particularly, the liquid feed pump 46, receive power from the secondary battery 80 of the information processing apparatus 18 via the second power-supply terminal (i.e., the auxiliary-section input power-supply terminal). The reason is that many information processing apparatuses connected to the fuel cell units 10 typically include secondary batteries and thus the use of the power obtained therefrom for the setup processing can eliminate secondary batteries in the fuel cell units 10. This can simplify the configuration of the fuel cell unit 10 and can reduce the cost.

On the other hand, according to a second embodiment of the present invention, the fuel cell unit 10 has a built-in secondary battery. With this arrangement, the setup processing can be performed even when an information processing apparatus that does not include a secondary battery is connected.

According to the first embodiment described above, the EEPROM 99 of the fuel-cell controller 41 and the real-time clock 115 of the power-supply controller 77 are used to provide a configuration for determining elapsed time $\Delta T$ (the difference between the previously-used year/month/date and the present year/month/date). However, another configuration may be used to achieve the fuel cell unit according to the present invention, as long as elapsed time $\Delta T$ can be determined.

The present invention is not limited to the specific embodiments described above, and thus changes and modifications can be made thereto without departing from the sprint and scope of the present invention. The components disclosed in the embodiments can be appropriately combined to pro vide various modifications. For example, one or more of the components may be eliminated from the components illustrated in the embodiments. Additionally, the components illustrated in the different embodiments may be appropriately combined.

What is claimed is:

1. A fuel cell unit comprising:
   a connection portion for connection with an external apparatus;
   a fuel cell for generating power to be supplied to the external apparatus via the connection portion, the fuel cell having an electrolyte membrane;
   auxiliary sections for feeding fuel to the fuel cell; and
   a controller for determining whether or not an elapsed time from a last use has reached a predetermined period,
   wherein, when the controller determines the elapsed time has reached the predetermined period, the controller performs hydration processing for actuating the auxiliary sections and feeding the fuel to hydrate the electrolyte membrane; and
   wherein, when the controller performs the hydration processing, the controller actuates the auxiliary sections by using power of a power source supplied from the external apparatus via the connection portion, the power source being provided in the external apparatus.

2. The fuel cell unit according to claim 1, further comprising a storage in which time information indicating time of the last use is stored,
   wherein,
   the controller includes a communication controller for communicating with the external apparatus via the connection portion, and determines the elapsed time in accordance with the time information indicating the time of the last use stored in the storage and the information indicating the present time which is received from the external apparatus by the communication controller.

3. The fuel cell unit according to claim 1, wherein the controller performs the hydration processing when the fuel cell unit is used for a first time.

4. The fuel cell unit according to claim 1, wherein the controller determines whether or not the hydration processing is needed, and when the controller determines that the hydration processing is needed, sets a state of the fuel cell to a state indicating the hydration processing is needed.

5. The fuel cell unit according to claim 1, wherein the controller determines whether or not the hydration processing is completed, and when the controller determines that the hydration processing is completed, sets a state of the fuel cell to a state indicating the hydration processing is completed.

6. The fuel cell unit according to claim 1, further comprising a storage, and
   wherein,
   the controller includes a communication controller for communicating with the external apparatus via the connection portion, and memorizes information indicating a present time which is received from the external apparatus by the communication controller into the storage after the hydration processing.

* * * * *

UNITED STATES PATENT AND TRADEMARK OFFICE
CERTIFICATE OF CORRECTION

| | | |
|---|---|---|
| PATENT NO. | : 7,618,727 B2 | Page 1 of 1 |
| APPLICATION NO. | : 11/509654 | |
| DATED | : November 17, 2009 | |
| INVENTOR(S) | : Nakamura et al. | |

It is certified that error appears in the above-identified patent and that said Letters Patent is hereby corrected as shown below:

Title page, Item (63), in the Related U.S. Application Data, please insert:

--Continuation of PCT International Application No. PCT/JP2005/003705, filed February 25, 2005--.

Title page, Item (30), in the Foreign Application Priority Data, please insert:

--Feb. 27, 2004 (JP) ........... 2004-054880--.

Signed and Sealed this

Sixteenth Day of March, 2010

David J. Kappos
*Director of the United States Patent and Trademark Office*